United States Patent
Hughes et al.

(10) Patent No.: US 11,846,734 B2
(45) Date of Patent: Dec. 19, 2023

(54) BRACKET FOR HOLDING UNIVERSAL TRANSDUCER FOR USE WITH A FISHING BOAT

(71) Applicant: Clearwater Concepts of Missouri, LLC, Purdy, MO (US)

(72) Inventors: Timothy R Hughes, Reed Springs, MO (US); Michael L Roller, Purdy, MO (US)

(73) Assignee: CLEARWATER CONCEPTS OF MISSOURI, LLC, Purdy, MO (US)

( * ) Notice: Subject to any disclaimer, the term of this patent is extended or adjusted under 35 U.S.C. 154(b) by 0 days.

(21) Appl. No.: 17/300,082

(22) Filed: Mar. 3, 2021

(65) Prior Publication Data

US 2021/0278514 A1 Sep. 9, 2021

Related U.S. Application Data

(60) Provisional application No. 63/100,373, filed on Mar. 9, 2020.

(51) Int. Cl.
*G01S 7/521* (2006.01)
*B63H 20/00* (2006.01)
*G01S 15/96* (2006.01)

(52) U.S. Cl.
CPC ............ *G01S 7/521* (2013.01); *B63H 20/007* (2013.01); *G01S 15/96* (2013.01)

(58) Field of Classification Search
CPC ....... G01S 7/521; B01S 15/96; B63H 20/007; G10K 11/004
See application file for complete search history.

(56) References Cited

U.S. PATENT DOCUMENTS

| 3,989,213 | A | | 11/1976 | Allen |
| 3,989,216 | A | * | 11/1976 | Veatch ................. G10K 11/004 248/278.1 |
| 4,555,233 | A | | 11/1985 | Klammer et al. |
| 4,979,153 | A | * | 12/1990 | Terry .................... A01K 79/00 340/573.2 |

(Continued)

*Primary Examiner* — Isam A Alsomiri
*Assistant Examiner* — Joseph C Fritchman
(74) *Attorney, Agent, or Firm* — Armstrong Teasdale LLP

(57) ABSTRACT

A bracket for holding a universal transducer for use with a fishing or other boat, including a transducer assembly, having a transducer shaft, which brackets a transducer at its bottom end, while its upper end is connected either to the side of the boat, or onto the upper portions, such as the gear box, of the associated trolling motor, to provide the means for scoping the underwater typography through usage of a universal transducer, as available in the art. The upper end of the transducer shaft connects to a bracket, applied onto the bracket is a geared motor, such as a reversing motor, that can pivot the transducer in an approximate 360-degree direction. The identified bracket mount can secure directly to the side of the boat, in which case the mount separates, for removal of the transducer assembly, or its application therein, in preparation for usage, or the bracket mount may secure to the underside of the trolling motor gear box or housing, and be simultaneously operative in conjunction with the maneuvering of the trolling motor, during its usage, or when positioned into a nonusage location upon the surface of the associated boat.

6 Claims, 6 Drawing Sheets

(56) References Cited

U.S. PATENT DOCUMENTS

| | | | | |
|---|---|---|---|---|
| 4,982,924 | A | | 1/1991 | Havins |
| 5,016,225 | A | * | 5/1991 | Blomberg ............ G10K 11/006 248/205.5 |
| 5,182,732 | A | * | 1/1993 | Pichowkin ........... G10K 11/355 367/16 |
| 5,465,633 | A | | 11/1995 | Bernloehr |
| 5,529,272 | A | * | 6/1996 | Baublitz, Sr. ........ F16M 13/022 248/231.71 |
| 6,254,441 | B1 | | 7/2001 | Knight et al. |
| 6,325,685 | B1 | * | 12/2001 | Knight ................. B63H 20/007 440/53 |
| 6,661,742 | B2 | | 12/2003 | Hansen |
| 6,899,574 | B1 | * | 5/2005 | Kalis ....................... B63J 99/00 367/173 |
| 6,928,948 | B1 | * | 8/2005 | Shannon ............. G10K 11/006 73/866.5 |
| 7,036,451 | B1 | * | 5/2006 | Hutchinson ............ B63B 17/00 248/231.71 |
| 7,722,417 | B2 | | 5/2010 | Bernloehr et al. |
| 7,972,188 | B2 | | 7/2011 | Bernloehr et al. |
| 9,296,455 | B2 | | 3/2016 | Bernloehr et al. |
| 10,281,576 | B2 | | 5/2019 | DePasqua |
| 10,293,900 | B1 | | 5/2019 | Leonard |
| 11,217,216 | B2 | | 1/2022 | Vance |
| 2018/0281914 | A1 | * | 10/2018 | Burton ................. B63H 20/007 |

* cited by examiner

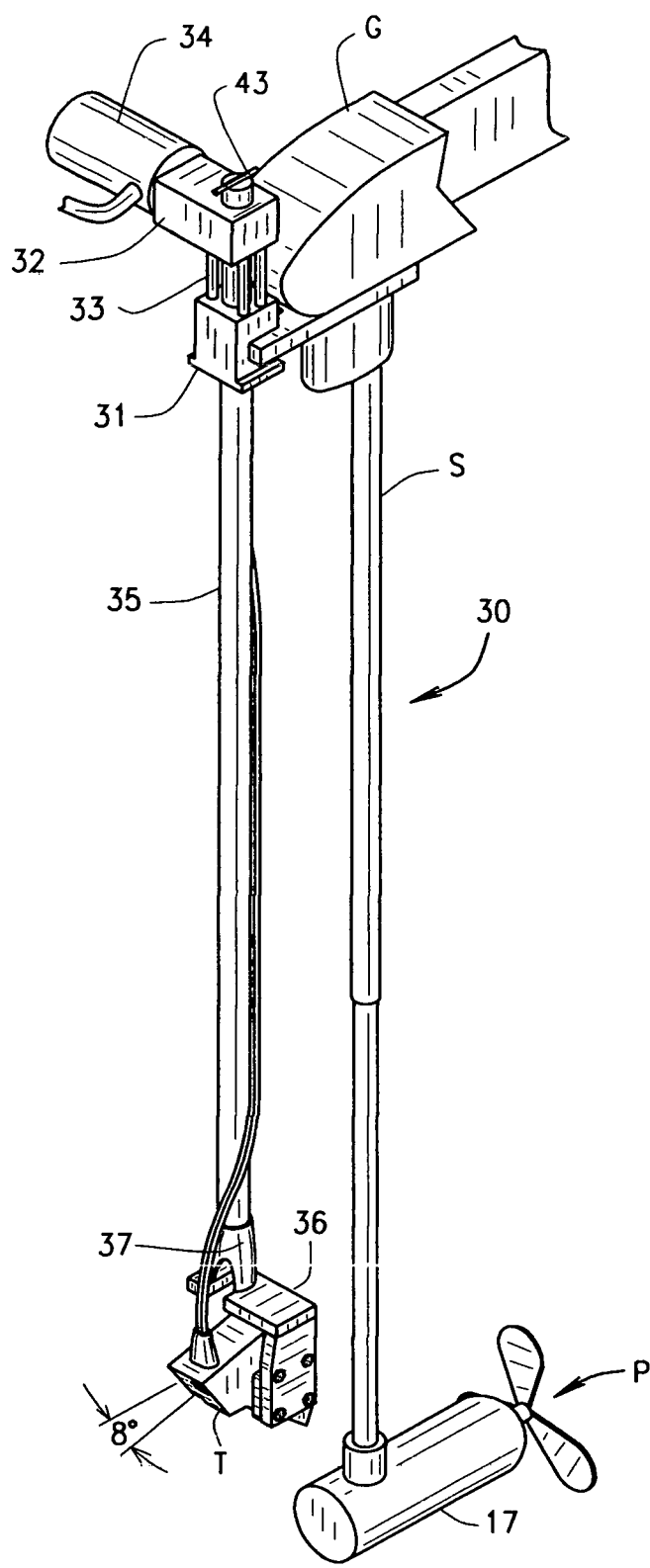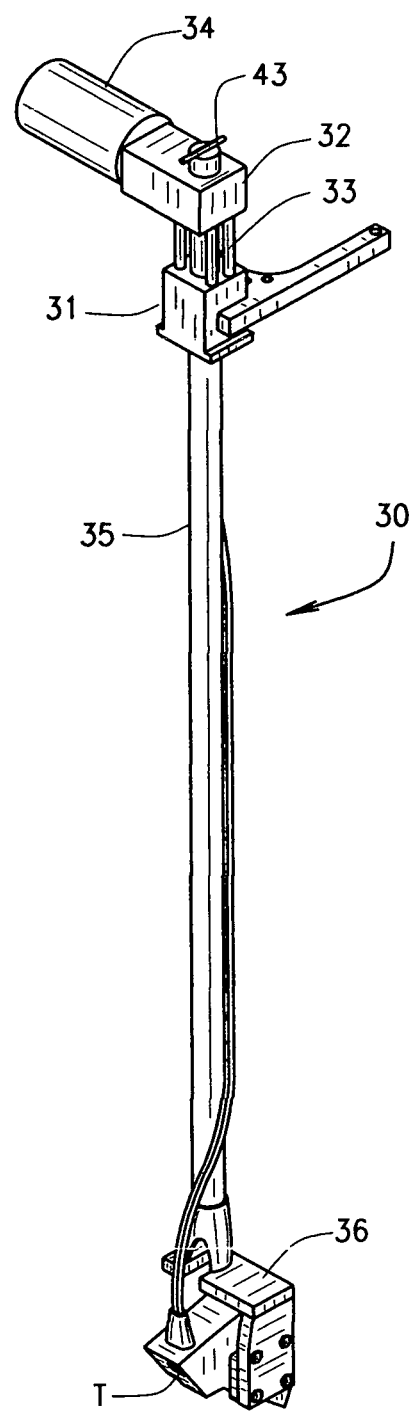
FIG. 8
FIG. 9

BRACKET FOR HOLDING UNIVERSAL TRANSDUCER FOR USE WITH A FISHING BOAT

CROSS REFERENCE TO RELATED APPLICATIONS

This is a nonprovisional patent application that claims priority to the provisional patent application having Ser. No. 63/100,373, filed on Mar. 9, 2020.

FIELD OF THE INVENTION

This invention relates to a bracket for use with either the gunnels or side edge of the fishing boat, or in combination with its trolling motor, to provide for support for the Live Scope type of transducer that can pivot from 0-360 degrees, in directing its sonar both forwardly and downwardly for a substantial distance, and which is mounted so as to clear the adjoining trolling motor, and the bottom of the boat, to provide a clear and unobstructed scan of a distant region of the water for the boat operator and fisherman.

BACKGROUND OF THE INVENTION

Initially, this invention pertains to adding further improvements to the method and system for utilizing a transducer for scoping the underwater region under a fishing boat so that the user can get a clear indication of the contours of the bottom of the lake or river, and to detect the presence of any underwater attractants, and the fish associated therewith, to benefit the ability of the fisherman to make a more knowledgeable catch while pursuing his/her piscatorial pursuits.

As is well known in the art, trolling motors have been around for many, many years. Such type trolling motors can be seen in the prior United States patent to Klammer, et al, U.S. Pat. No. 4,555,233, which show an electric trolling motor and its mounting device which provides for locating of the trolling motor in the water, when used, but that it can be pivoted upwardly upon its mount, and pulled into the boat, as during nonusage. Such tolling motors have been around since the 1950's and 1960's, to aid, particularly the fishermen, in maneuvering the fishing boat at much slower and controlled speeds.

Then, the transducer came into being approximately in the 1970's and 1980's, that provided for the use of sonar for scoping the proximate location of the underwater region, to aid the fisherman in what became identified as the fish finder, for use for that purpose. Now, the transducers have improved to such an extent that such sonar is capable of being applied to scanning the bottom of the water up to approximately 200 feet deep, and at the same time 200 feet forwardly of the transducer, to provide a more thorough view of the entire region, the location of any brush pile fish attractants, and the location of any individual or schools of fish, to aid the fisherman in obtaining more direct knowledge of the actual location of the fish, during participation in this activity. Such a transducer is identified in the market as the Live Scope Transducer, and is available from Garmin Ltd, located in Olathe, Kansas. This type of scope is quite effective in providing a view of the surrounding underwater area, even up to 360 degrees, but the current mounts that locate the transducer upon the boat, or upon the trolling motor, generally provide an obstructed view of the surrounding underwater area, due to the blockage provided by the bottom of the boat, or the obstruction presented by means of the adjacent motor and propeller of the trolling motor, during their usage.

The problem with the various mounts for the available transducers is that most of such transducers provide just a forward directing of its sonar, and are controlled by the direction that the trolling motor moves the boat, so that if the wind blows the boat in one direction, or the trolling motor moves the boat in another direction, the transducer is simply directed in that forward direction, unlike the types of mounts as can be identified within the analysis of the current invention.

Most forward shooting transducers are mounted on the shaft of the trolling motor. However, a problem arises when the wind is blowing, or the trolling motor is in an auto pilot mode. In either case, the trolling motor is either pointing into the wind to keep the boat straight and underway, or, the direction of the auto pilot is set in another position. This does not allow the user to target in areas down either side of the boat, or forwardly, because you would have to change the direction of the trolling motor, each time, to scope the entire region underwater.

This current unit allows the boat operator to independently and remotely move the transducer to view any target area within 360 degrees, so that the fisherman can scope the entire region, to see where the fish are, or where the underwater attractants are located, or where the bait fish may reside, to allow the fisherman to move in that direction that may provide for more favorable results when casting.

Numerous types of such standard trolling motors can be seen in a variety of prior art patents, such as U.S. Pat. No. 6,254,441, upon a trolling motor propulsion unit and support shaft; U.S. Pat. No. 5,465,633, upon a foot actuated trolling motor control; U.S. Pat. No. 6,325,685, upon a trolling motor system; U.S. Pat. No. 7,722,417, disclosing a trolling motor mount with mono main arm; U.S. Pat. No. 7,972,188, upon another trolling motor mount; and U.S. Pat. No. 9,296,455, also upon a trolling motor design. These are examples of known prior art relating to this technology.

Any patents to the aforesaid Garmin can be seen U.S. Pat. No. 10,281,576, disclosing a method for predetermining underwater objects using a rotatable scan sonar unit linked to a boat.

This is the history of these transducer devices, as known to the Applicant herein.

SUMMARY OF THE INVENTION

The concept of this current invention is to provide structure and means for furnishing clear unobstructed 360 degree viewing of underwater objects, and geography, with the use of a wide range scanning transducer, such as those current available in the art, that can scan downwardly approximately 200 feet, and forwardly approximately 200 feet, and provide a full screen view of the scanned territory, at the same time, the means for bracketing such a transducer to either the boat, or the trolling motor, which can furnish a 360 degree view of the underwater territory, either through the manual or motorized operations of the scanning assembly that can pivot the sonar during its usage, and provide a means for alerting the user of the direction that the transducer is scanning, so as to allow the boat to be maneuvered into that direction when favorable objects, such as fish, are located.

The subject matter of this invention is actually formed of two embodiments.

Initially, one embodiment provides a bracket for holding the transducer assembly to the side or gunnel of the boat, supporting a downwardly extending shaft, the upper end of the shaft is connected with a gear box and reversing motor, that provides for turning of the shaft, while the lower end of the shaft includes a transducer retaining bracket, that holds the transducer in position, to furnish that 360 degree viewing of the underwater territory, upon operations of the said associated reversing motor. The bracket holding the transducer assembly to the boat, incorporates formed contours, that allows for that part of the bracket to secure to the boat, through fastening means, while the second part of the bracket fits within an engaging slot, within the first bracket, so that the transducer assembly can be inserted therein for usage, or slid upwardly therefrom, for disengagement as when not in usage, such as when the boat is moved. The specified bracket includes a female portion that incorporates a T-slot, while the male portion, holding the shaft, for manipulation, is for having an extending T structure that engages and locks within the female part, during application and usage.

The second embodiment of the invention is to provide for the transducer assembly to be operatively associated directly with the trolling motor, by mounting to its upper gear housing, and yet provide for independent pivoting of the transducer components, in a 360 degree direction, notwithstanding being mounted onto the trolling motor itself, as to be further explained. Its bracket includes a housing portion that supports the transducer shaft for pivot, and with the upper part of the housing engaging the gear box, and its reversible motor, for independent operations of the transducer assembly, as mentioned, apart from the pivot of the trolling motor itself, during its usage. The transducer itself is connected to a lower bracket, that secures with the bottom of the transducer shaft, and the bracket supports the transducer in an approximate 5-15 degree slant, preferably at an 8 degree slant, so that the transducer, when operative, can clear the associated trolling motor, if necessary, to scan the underwater horizon for observance and guidance to the boat operator. Although, the transducer when mounted onto a separate shaft from the trolling motor shaft, does not necessary require any offset, but can be mounted perpendicular to the body of water, and thereby allow for better direct viewing of the water straightforwardly, and straight downwardly, to get a better viewing picture of the surrounding terrain.

It is, therefore, the principal object of this invention to provide a mounted attachment to the main body of the trolling motor and/or the side of the boat. The advantages of this trolling motor mount is that it allows for the transducer unit to be launched and retracted at the same time as the trolling motor, when it is lowered or raised in the water, as is frequently done by the boat operator, or the fisherman. Whereas, the side mount system requires that you manually insert and remove the transducer unit from the side mount, and to separate it from the gunnels of the boat as when not in usage.

A further object of this invention is to provide a transducer shaft that extends from the top of the mount, downwardly through the mount, and to a vicinity several inches short of the trolling motor head, when installed for usage.

A further object of this invention is to provide a form of 12-volt operative reversable motor, where the motor is attached to the gear mount, and the transducer shaft of the motor is attached to the transducer shaft, through a gear box, provided within the said mount.

A further object of this invention is to provide a bracket mount, which is attached to the bottom of the transducer shaft, with the transducer itself attached to it for horizontal scoping, or being connected at an angle, to its bottom bracket, in order to clear any associated trolling motor or the boat to which it may mount.

A further object of this invention is to provide a foot switch, such as a toggle or rocker switch, enclosed in its usual case, and which controls the direction of pivot of the reversable motor and the transducer assembly in order to furnish a 360 degree scan of underwater topography, during usage.

A further object of this invention is to provide an indicia, such as an arrow, attached to the top of the transducer shaft, to show the direction the transducer is pointing, so that when an object, such as fish, are detected, the transducer can remain fixed upon that object, while the trolling motor is pivoted to move the boat in a direction towards that identified object.

Still another object of this invention, in greater detail, is to provide a transducer unit controlled by a battery connected with the geared motor to turn the transducer separate from the trolling motor and its shaft, in order to keep a fix on the objective target detected by the said transducer.

Another object of this invention is to provide a 12-volt switch, for operation of a transducer assembly, such as a foot toggle, that operates separately from the trolling motor foot operated switch.

Another object of this invention is to provide a transducer unit which along with its bracketing assembly, can be mounted onto the head of any trolling motor, or on the side of any boat, through usage of the designed brackets of this invention.

Another object of this invention is to provide a boat side mounting bracket that fits into a T-way or dovetail like slot to provide a very secure fit of the transducer assembly unit and its associated shaft when engaged for operation.

Still another object of this device is to provide a transducer unit, with its bracketed shaft, that can be launched with the trolling motor, for directional operations in conjunction therewith, or which can be applied to the side of the boat, and which can be used separately from the functioning of the trolling motor itself.

A further object of this invention is to provide a transducer unit, on its bracketed shaft, that can pivot from 0-360 degrees, and have indicia or an arrow on top of the unit for providing a clear indication of the direction that the transducer is projecting its sonar.

These and other objects may become more apparent to those skilled in the art upon review of the summary of the invention as provided herein, and upon undertaking a study of the description of its preferred embodiments, in view of the drawings.

BRIEF DESCRIPTION OF THE DRAWINGS

In referring to the drawings:

FIG. 8 is an isometric view of a modification to the bracketing of the transducer unit, and its connecting shaft, directly to the gear box portion of the trolling motor;

FIG. 9 is an isometric view of the transducer unit, with its supporting bracket and shaft, and disclosing the gear box and reversable motor applied for operations of the transducer assembly during its usage;

DESCRIPTION OF THE PREFERRED EMBODIMENTS

Figure 1:
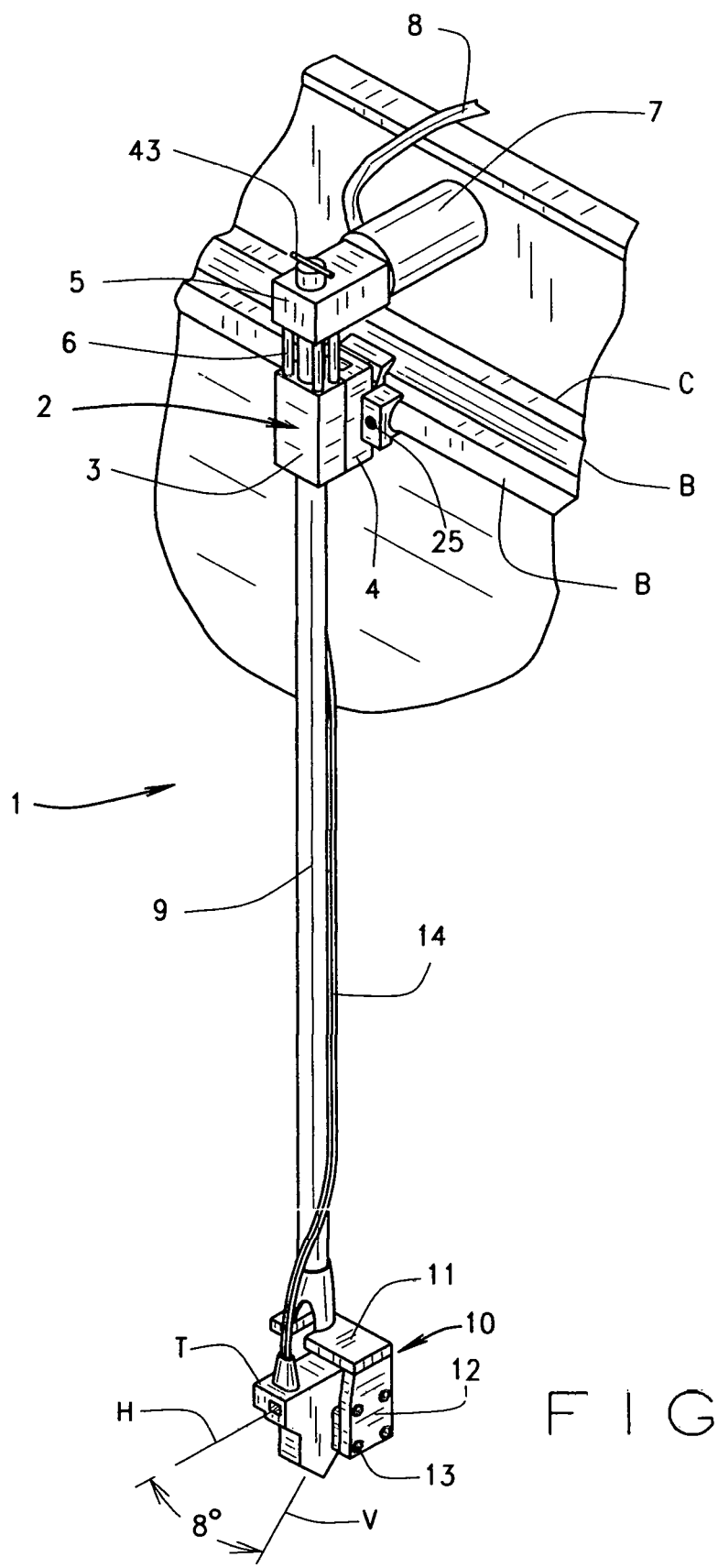
FIG. 1 provides an isometric view of the transducer unit, its bracketed shaft, all applied to the side or gunnel of the associated boat.

In referring to the drawings, and in particular FIG. 1, therein is shown one embodiment for the bracket for holding universal transducer for use with a fishing boat, as noted at 1. As disclosed, the bracket is noted at 2 and which comprises of two parts, a male portion 3 and a female portion 4, the female portion shown being connected to the side, bumper, or gunnel of the boat B, as noted. The bracket fixes the gear box 5 into position, by means of a series of fasteners 6 and the gear box connects with the 12-volt reversable motor 7, which is connectable to an electric cord 8 to receive its electrical charge. Extending downwardly from the gear box 5, and through the bracket 2, is the transducer shaft 9, the bottom of the shaft including a transducer bracket 10, as noted, and this transducer bracket does hold the universal transducer T in place, during usage. As can be seen, the transducer bracket is L-shaped, the upper flange 11 securing to the bottom of the transducer shaft 9, while the downwardly extending plate 12 secures the transducer in place, through the use of a series of fasteners, as noted at 13. It can be seen that there is an electric line 14 that extends downwardly from the upper components of this bracket, in order to deliver electric charge to the transducer, to provide for its operation, and to transmit data back to the sonar screen that shows the trajectory of the underwater typography, when the transducer is operative.

This type of universal transducer, as previously summarized, does project its sonar pulses both generally horizontally, as noted at H, and also extends its sonar downwardly, generally vertically, as a B, to pick up an entire range of scan of the underwater typography, in the manner as previously described, and such a transducer is very effective at scanning objects as much as 200 feet forwardly, and 200 feet downwardly, during its usage and application. Thus, the boat operator, or the fisherman, have a complete scan for a good distance of the entire underwater, and can see schools of fish, isolated big fish, brush piles, and other fish attractants, including collection of minnow bait fish, to allow the fisherman to move the boat directly into their direction, to enhance the ability to catch fish, during usage.

As can also be noted, the upper side of the boat B generally exhibits a number of contours, such as an upwardly convex portion, as at C, a bumper as at B, and then the curved underside of the gunnel, as noted.

Figure 2:
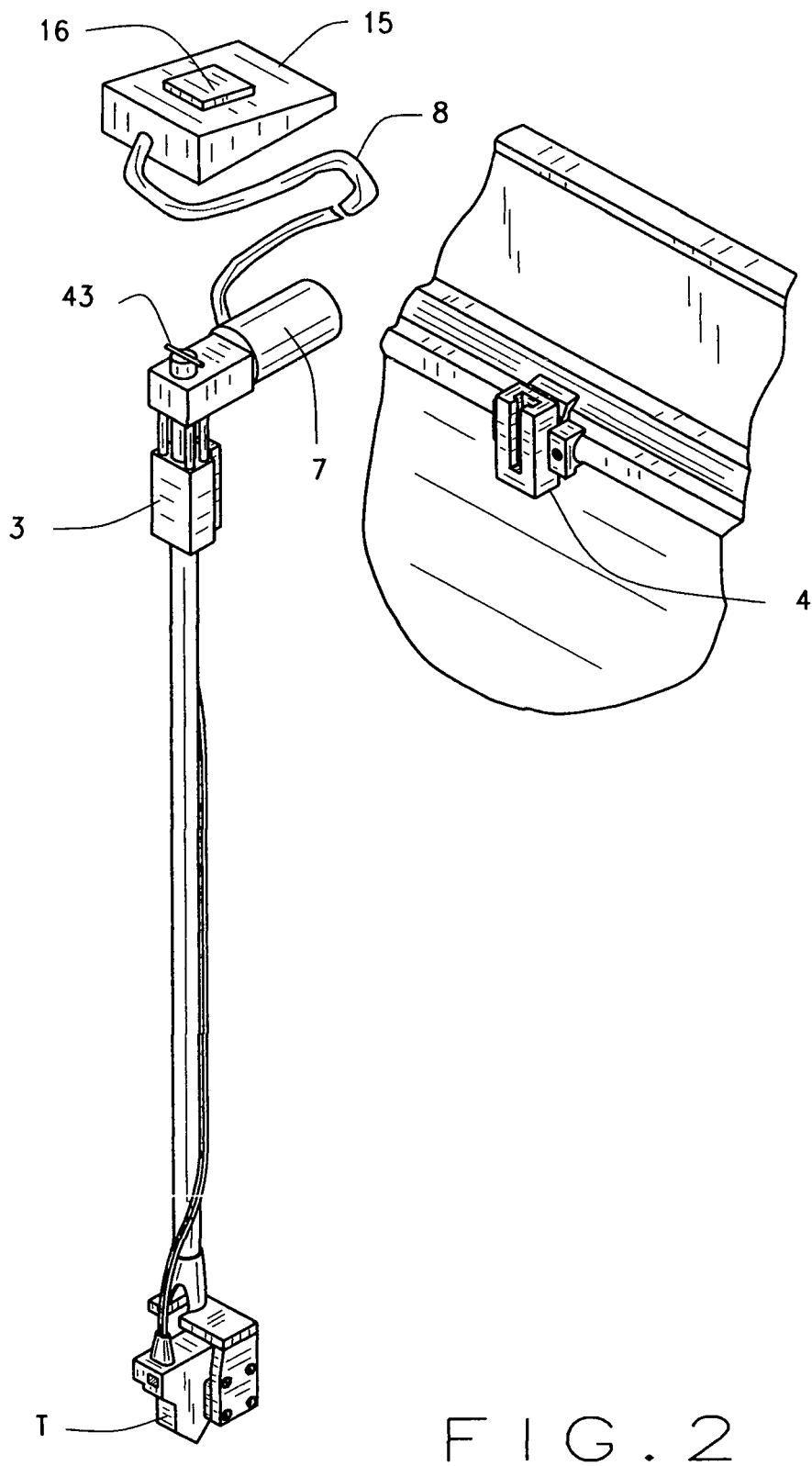
FIG. 2 shows the transducer unit and its bracketed shaft separated from its bracket engagement means, for application to the side of the boat, and further disclosing its gear box and motor that electrically connects with the toggle, or foot operated rocker switch, that are provided for independent operation of the associated transducer, during usage, and separate from the operations of the other motor components of the associated boat.
Figure 3:
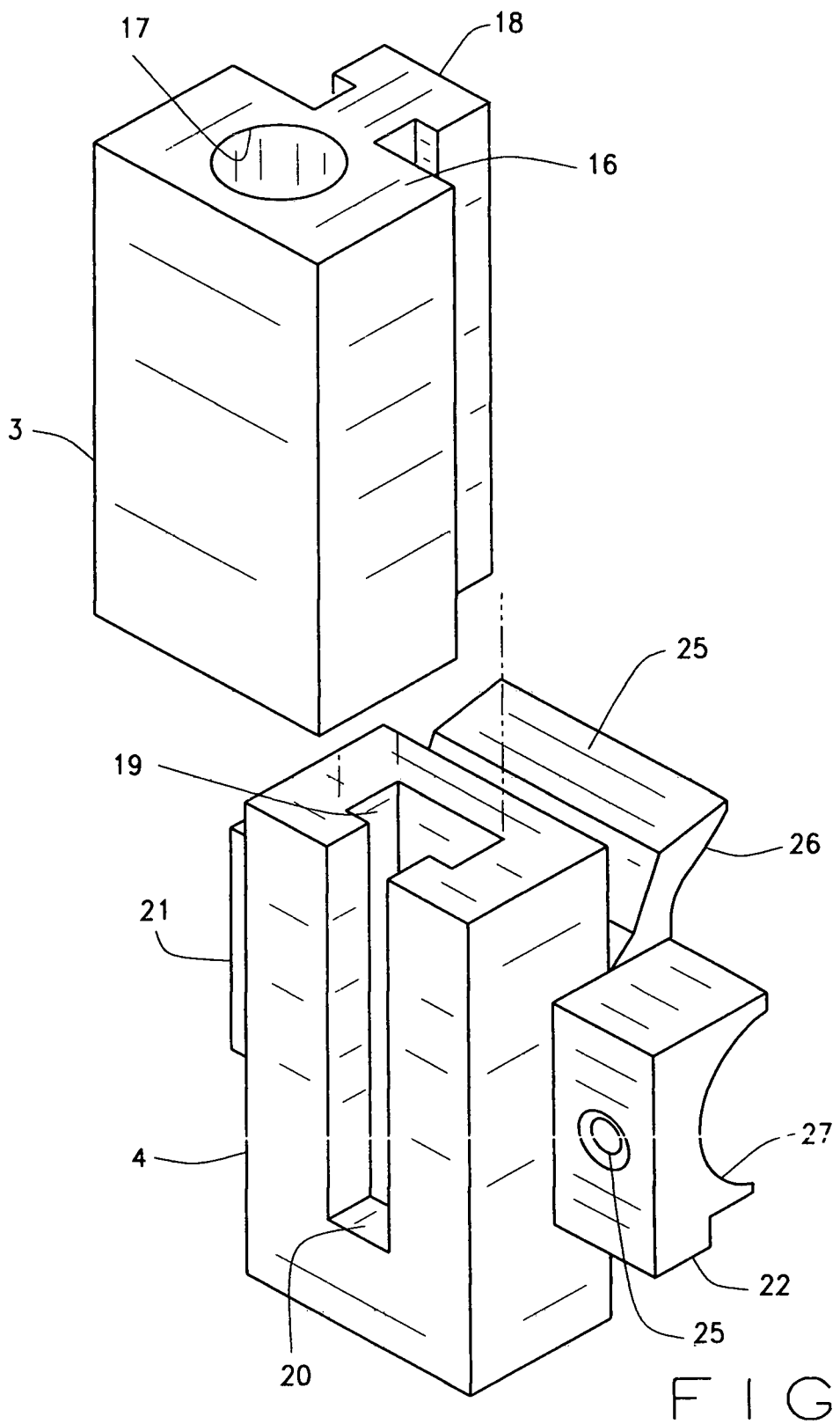
FIG. 3 shows the bracket assembly that secures the transducer unit and its shaft to the side of a boat.
Figure 4:
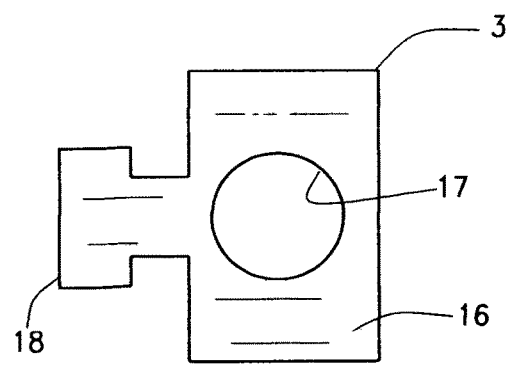
FIG. 4 is a top view of the male component of the bracket assembly.

The bracket 2, and its female portion 4, and male portion 3, can be seen in FIG. 2, and the clamping, by way of fasteners, of the female portion 4 onto the upper side of the boat, can be readily be seen thereat. Also, as noted, the transducer bracket, through its motor 7 may be connected through the electrical line 8, with a rocker switch, as at 15, which will allow the operator to control the pivoting of the transducer T through usage of this device, to an approximate 360 degrees horizon, when detecting underwater objects, such as fish, during usage. Such a rocker switch may be in the form of a toggle, through its switch 16, so that the reversing motor 7 can be turned in either direction, to vary the movement of the transducer either in a clockwise, or counterclockwise direction, during usage. The cable 8 supplies sufficient energy to the transducer, and its bracket, to provide for both the operations of the motor, and the sonar, and provides feedback of detected objects, through the sonar, to the cable, and to a screen display. The cable also includes means for conducting electrical energy from the battery, to the various operative components of this universal transducer assembly.

The particular bracket mount 2 of this invention, and more specifically its male portion 3 and the female portion 4 can be seen in FIGS. 4-7. As noted, the male portion includes a housing 16 which has a channel 17 provided therethrough, and through which the transducer shaft 9 inserts. The opposite side of the male portion includes means for engagement of this portion with the female portion 4, when the transducer assembly is installed for usage, laterally of the shown boat. As can be seen, in this instance, the connecting portion is a T-shaped extending configuration, as at 18, and this particular T-shaped portion is provided for engaging within the T-slot 19 of the female part 4. There is a bottom 20 provided within the T-slot 19, so as to limit the amount of downward sliding movement of the male portion 3, within the portion 4, when the transducer assembly and its shaft 9 are interconnected, in preparation for its usage and application. Obviously, it is just as likely that the male portion 3 could connect with the boat and the female part 4 accommodate holding of the transducer shaft during usage.

Figure 6:
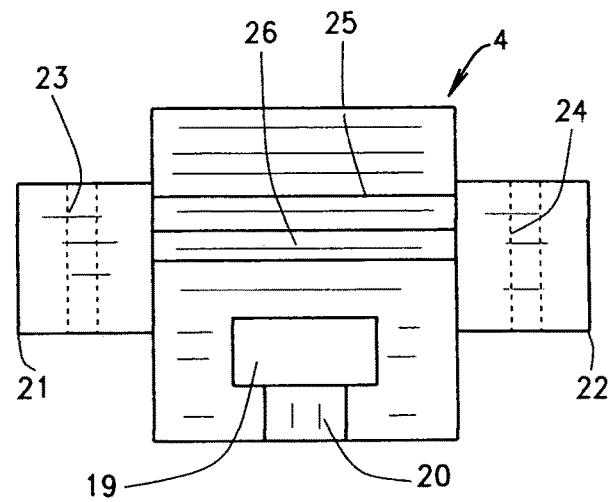
FIG. 6 is a top view of the female portion of the bracket, as noted in FIG. 3.
Figure 5:
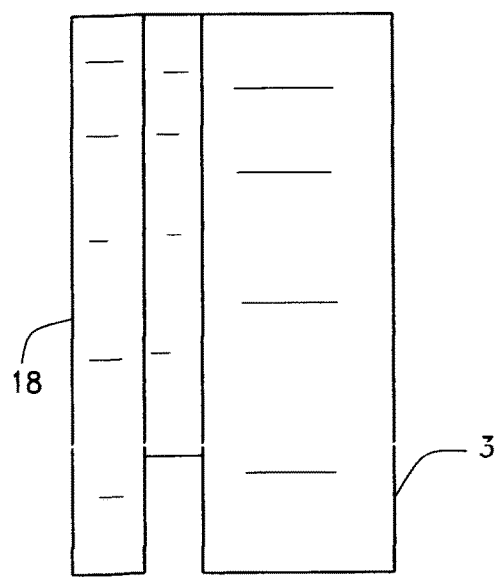
FIG. 5 is a side view of the bracket assembly of FIG. 4.
Figure 7:
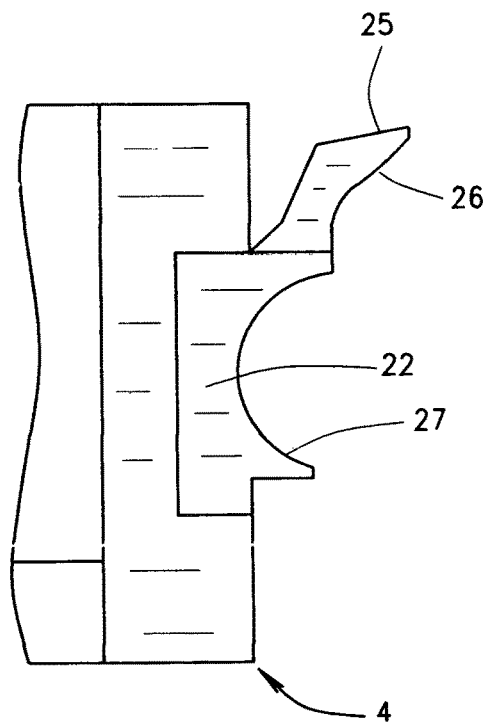
FIG. 7 is a side view of the female portion of the bracket unit as seen in FIG. 6.
Figure 10:
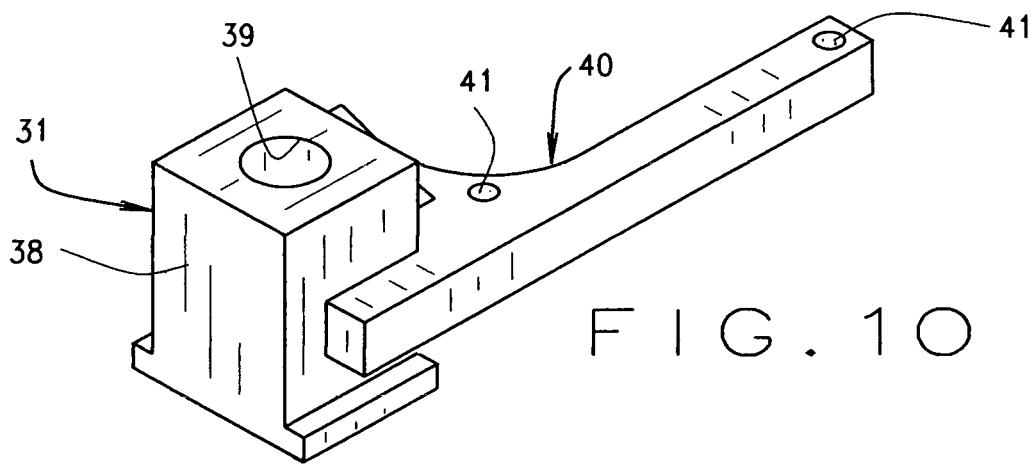
FIG. 10 is an isometric view of the bracket that affixes the transducer and its shaft directly to the trolling motor head.
Figure 11:
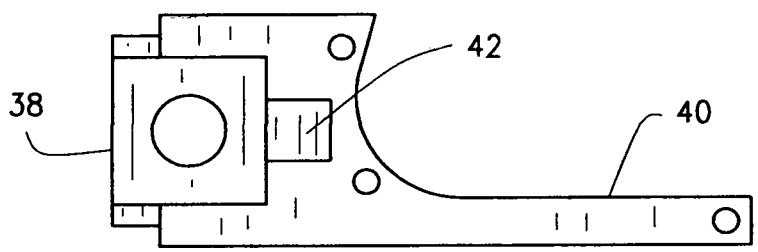
FIG. 11 is a top view of FIG. 10.
Figure 12:
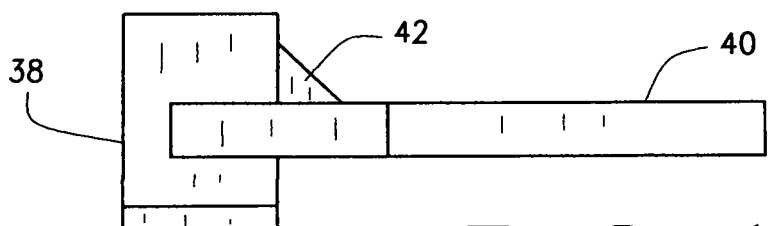
FIG. 12 is a right-side view of FIG. 11.
Figure 13:
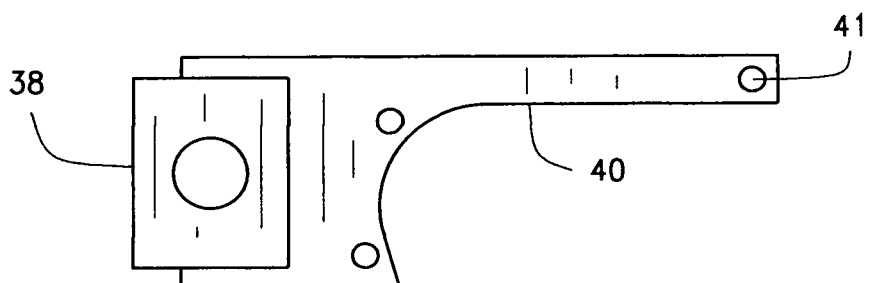
FIG. 13 is a bottom view of the bracket and shaft mount of this modification to the invention.

As can also be seen, as in FIGS. 6 and 7, the female portion has a pair of laterally extending bosses 21 and 22, and which have apertures 23 and 24, available for accommodating fasteners, one as shown at 25, as noted in FIG. 1, for securement of the female portion of the mounting bracket 4 to the side of the boat, as previously reviewed. Furthermore, as can be seen, the lateral bosses incorporate an upwardly extending portion 25, spanning across the portion, which has some curvature to it, as at 26, and along with the curvature 27 of the lateral mount, are designed to accommodate their snug fitting against the side of the boat B, as noted in FIG. 1, to assure that the bracket mount is very stability secured thereto, during all phases of application and usage.

This essentially defines the structure of the first embodiment of Applicant's universal transducer bracket, of the type that is secured directly to the side of the boat, as distinct from the second embodiment, where it mounts upon the trolling motor itself, in preparation for usage.

FIGS. 8 and 9 show the second embodiment for the universal transducer bracketed mount 30 of this invention. As can be seen, in this case, the mount 31 connects to the gear box G of the trolling motor itself. The trolling motor has its usual downwardly extending shaft S that connects to its motor M and associated propeller P.

With this bracketed invention, the mount 31 secures the gear box 32 thereto, by means of a series of fasteners 33, and has its 12-volt reversing motor 35 affixed thereto, which when operative, can translate motion to the gear box, and to the transducer shaft 35, to affect its turning, and the turning of its lower transducer bracket 36, the structure of which has been previously defined. In this particular instance, it can be seen that the universal transducer T is oriented at an approximate 5-15 degrees downwardly, and more preferably at approximately 8 degrees, as can be noted, and for the following purpose. If the universal transducer T is mounted to project sonar directly horizontally, when it is turned in a direction facing the adjacent trolling motor 17, its sonar waves will be blocked. Hence, by directing the sonar of the transducer slightly downwardly, within a range of degrees as previously defined, the sonar extends beneath the trolling motor, and/or not obstructed by it, during its usage. Usually, the universal transducer T will be located approximately 4-8 inches above the trolling motor, so as to not detract from the operations of the motor, during movement, and thus, the reason for its mounting angularly downwardly, as noted, and as explained. Although, it is just as likely that the gear box 32 can mount directly onto the mount 31, directly, and eliminate the need for usage of the series of fasteners 33, as previously described.

The bottom of the transducer shaft 35 connects with the upper flange of the transducer bracket 36, as can be noted at 37.

There are a number of reasons why the mounting of the transducer assembly directly to the trolling motor are more useful. Initially, these trolling motors, as previously explained in the prior art, generally secure to a cradle, and which is connected to the upper surface of the boat, proximate its side, and then the entire trolling motor, and its transducer assembly, of this invention, can all be pulled upwardly and pivoted onto the surface of the boat, as during nonusage. Then, when the trolling motor and its transducer assembly is to be used, the entire combination can be pivoted outwardly, and downwardly, into the water, adjacent the side of the boat, all in one motion. Hence, this eliminates the need to attach the transducer assembly 1 to the side of the boat, and to engage its various mount portions, together, in preparation for its usage. By simply pivoting the trolling motor into the water, the transducer assembly is moved simultaneously, in preparation for its immediate application and usage.

The particular bracket mount 31 can be seen in FIGS. 10-13. As noted, it includes its housing 38, which incorporates a channel 39 therethrough, and through which the transducer shaft 35 locates, when assembled. The housing includes an extending flange 40 and this flange is provided for mounting to the underside of the gear box G, of the trolling motor, as noted in FIG. 8. There are a series of apertures 41 provided through the flange 40, which accommodates fasteners for securement of the flange, and its associated housing 38, to the underside of the gear box G, as can be noted. The housing 38 and its extending flange 40 may be secured together, either by welding, or through the use of a fillet, as noted at 42, which may form the basis for welding of these two components together.

Thus, the concept of this invention is to provide for these various embodiments for securement of a universal transducer either to the boat, or to its trolling motor, and provide the means for surveying of the entire underwater features, for some distance forwardly and downwardly from the positioned transducer. Furthermore, in either instance, if the transducer assembly is side mounted to the boat, as noted in FIG. 1, or mounted onto the trolling motor itself, as noted in FIG. 8, in either instance, the transducer assembly, and its universal transducer, can be independently operated to provide a full scan of approximately 360 degrees underwater, beneath the boat, separate and apart from the actual operations of the trolling motor itself, for moving the boat in a particular direction. Hence, when the problem arises, as previously explained, when the wind may be blowing or the trolling motor is in an autopilot mode, and moving the boat in a particular direction, the transducer assembly can be independently operated, for scanning the underwater in all directions. And, when the universal transducer picks up an identification underwater, as for example, of a school of fish, the operator can note from the positioning of an indicia, indicator, or arrow, as noted at 43, and see what direction the transducer is oriented towards, and then can turn the trolling motor into a like direction, to lead the boat to the location of the object being sited, through usage of the mounted transducer assembly of this invention. In other words, the transducer is used to sight a target area, which informs the operator to turn the trolling motor and direct the boat into the same direction, as noted by the indicator 43 upon the transducer assembly, and its mount. All the while, the transducer will be fixed upon the target area, as the boat is directed into that direction.

Variations or modifications to the subject matter of this invention may occur to those skilled in the art upon review of the invention as described herein. Such variations, if within the spirit of the invention, as described herein, are set forth for illustrative purposes only. Any such variations are intended to be encompassed in the scope of any claims for patent protection issuing upon this development. The description of the preferred embodiments, and their depiction in the drawings, are set forth for illustrative purposes only.

What is claimed is:

1. A bracket for holding a transducer assembly to a boat and providing for unobstructed underwater scanning by the transducer assembly, the bracket comprising:
    a female housing portion for securing to an upper side of the boat, the female housing portion comprising a slot portion, an extension portion opposite the slot portion, and a lateral portion on at least one side of the slot portion, wherein the slot portion comprises an open top end and a slot end point at a bottom end of the slot portion, the lateral portion being secured to the upper side of the boat, a slot axis extending from the open top end to the slot end point; and
    a male housing portion adapted to hold the transducer assembly, the male housing portion comprising a vertical channel through which a shaft of the transducer assembly extends and an engagement portion, the engagement portion of the male housing portion configured for sliding into the slot portion of the female housing portion from the open top end to the slot end point to hold the transducer assembly secured to the upper side of the boat while allowing the shaft of the transducer assembly to turn in a clockwise or counterclockwise direction within the vertical channel of the male housing portion,
    wherein the extension portion of the female housing portion is contoured to contact the upper side of the boat at a first location and the lateral portion of the female housing portion is contoured to contact the upper side of the boat at a second location, the first location being disposed above the second location, and wherein the slot axis is oriented parallel to the vertical channel of the male housing portion and an axis perpendicular to the slot axis intersects the extension portion of the female housing portion and the vertical channel of the male housing portion when the bracket is attached to the boat.

2. The bracket of claim 1, wherein the engagement portion of the male housing portion comprises an extending T structure and the slot portion of the female housing portion comprises a T slot, wherein fitting together the engagement portion of the male housing portion and the slot portion of the female housing portion comprises the extending T structure of the male housing portion sliding into the T slot of the female housing portion by sliding downwards from the open top end of the slot portion to the slot end point.

3. The bracket of claim 2, wherein the slot end point is upwards of the bottom end of the slot portion.

4. The bracket of claim 1, wherein a back surface of the extension portion of the female housing portion comprises an arcuate surface that is contoured to contiguously fit against the upper side of the boat when secured.

5. The bracket of claim 1, wherein the at least one lateral portion of the female housing portion can accommodate fasteners for securing the female housing portion to the upper side of the boat.

6. The bracket of claim 5, wherein a back surface of the at least one lateral portion of the female housing portion comprises an arcuate surface that is contoured to contiguously fit against the upper side of the boat when secured.

* * * * *